Oct. 31, 1967 A. T. DEUTSCH 3,349,865
VEHICLE IMPACT DEFLECTOR ARRANGEMENT
Filed Sept. 24, 1965

INVENTOR,
Alexander T. Deutsch

United States Patent Office 3,349,865
Patented Oct. 31, 1967

3,349,865
VEHICLE IMPACT DEFLECTOR ARRANGEMENT
Alexander T. Deutsch, 1735 Riggs Place,
Washington, D.C. 20009
Filed Sept. 24, 1965, Ser. No. 490,016
1 Claim. (Cl. 180—93)

ABSTRACT OF THE DISCLOSURE

An impact absorbing fender for a vehicle, comprising ground-engaging means in order to lift up and cushion the vehicle upon engagement with the ground on impact.

---

Subject matter of this invention is a method and corresponding systems to absorb, transmit and deflect the impact-force, which results from the impact of a moving vehicle hitting a resisting surface, as it happens when a car hits a tree or collides with another vehicle or when an airplane can't be stopped at landing by conventional means or others. There are many shock-absorbing means known, as springs, pneumatic, hydraulic or others. There are fenders known which are used as brakes. There are means known to absorb the impact, by rolling back the seats or the vehicle's body. In most cases the normal wheel brakes suffice, that is if the vehicle's speed is small.

If the speed rises, collisions can become lethal. It is the purpose of this invention to prevent this within limits. In order to do so, I deflect the impact-force into a direction, which lifts up the vehicle at its impacted end, where it can oscillate. I use a swingable, hinged fender to transmit this lifting-up force from the movement of the vehicle's bumper, which moves back under impact. Any known transmission elements can be used. I found knee-lever transmission as practical. The fender, if the impact-ing-force is not too great, can work as a brake against the direction of the vehicle's movement. It lifts the vehicle only up, if the impact is vehement, as usual in collisons. If the impact and the vehicle's weight are too great, that is under the most radical conditions, the vehicle may overturn, but there would still be a great chance of saving lives, especially if seat-belts have been used. Means can also be provided to delay the movement of the fender, so it would be used only under severe conditions.

FIG. 1 shows the transmission of the impact upon the bumper of an automobile to the swingable fender, FIG. 2 is a modification and illustrates the car in the lifted-up position and FIG. 3 shows the detail A in side view, whereby the bumper-rod is shown in cross-section, this figure enlarged and the knee lever system represented in a near out-swung position.

Figure 1:
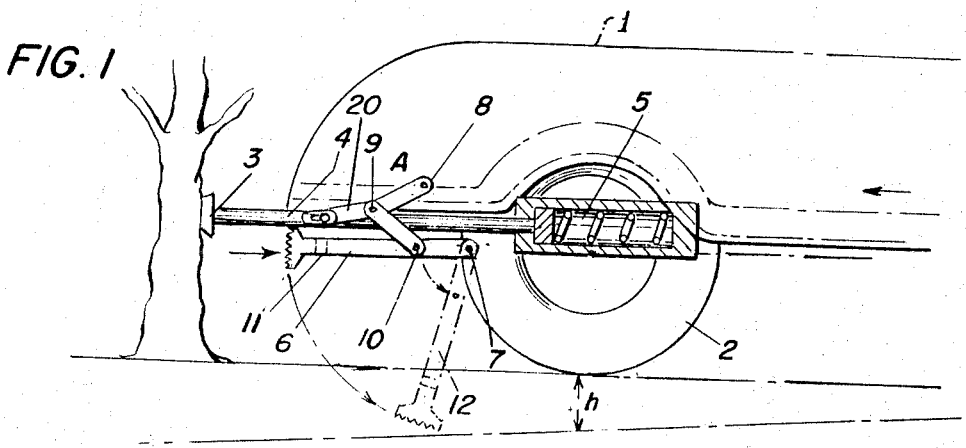
FIGURES 1, 2 and 3 illustrate an example of the invention.

In FIG. 1 is 1 the body of the vehicle, here an automobile, 2 its wheel, 3 its bumper, 4 the bumper-rod, flexibly supported at 5, 6 the swingable fender with its fixed hinge 7, 8 a fixed hinge for a knee-lever, 9 is the knees hinge, 10 the eye at the fender, to which the knee lever is tied, 11 a cross-bar of the fender, which is actually a fender at each car side, also in U-shape, 12 is the fender in out-swung position.

Figure 2:
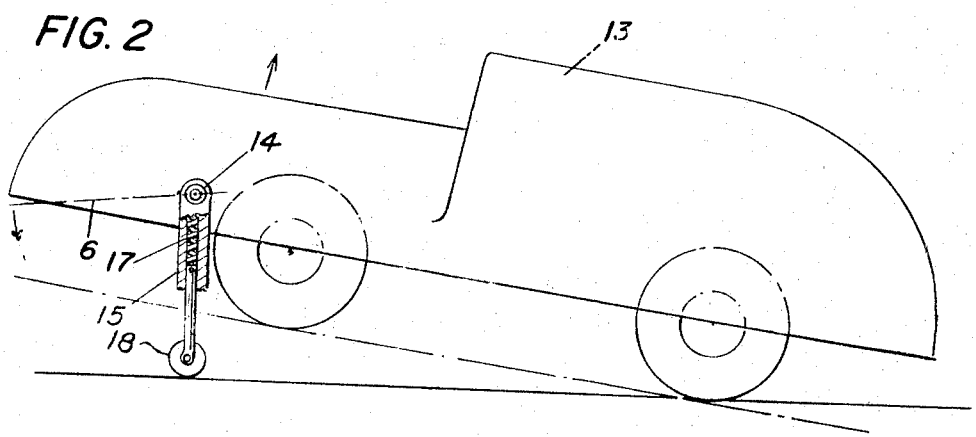

Of course any transmission elements can be used from the bumper-rod to the fender. In FIG. 1 the rod, moving back, activates the knee-lever and swings the fender gradually or vehemently out, according the amount of impact and acceleration. The rod can be provided with a slot or other means in which the knee-lever steering bar 20 can glide so that the fender is swung out only after a certain time-elapse after impact. In the lifted-up position the weight of the car tries to roll it back as the consequence of the car's inclination, as shown in FIG. 2. In this figure, 13 is the automobile's body, just schematically shown, 14 the fixed hinge of the swingable fender, shown here in its completely deflected position, at which the car is lifted up at the end, at which the impact occurred, 15 is the shock absorbing arrangement within the fender, so that the car may oscillate up and down, 17 is a spring within a cylindrical cavity in the fender's body, 18 a wheel which might be used instead of the usual friction-brake at the fender's end.

Figure 3:
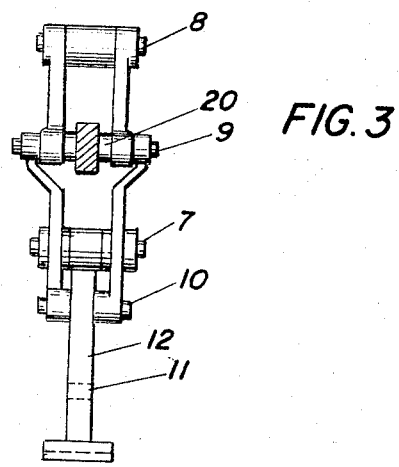

FIG. 3 enlarges in approximation the detail A of FIG. 1.

The deflection is not limited to the vertical direction. It may be arranged for any direction, with the exclusion of the horizontal, the limit being the state of the art.

In order to increase efficiency the wheel brakes too can be connected with the bumper-rod movement. Specifically solenoid brakes and cushion may be used.

In the case of airplanes means can be provided to activate the swingable fender by transmission means, for example electrical, from the pilot's seat.

The force transmission thru deflection can be carried out in different ways, into different directions, with the exception of the horizontal, while swingable braking means are used, which are tied to the bumper's movement. Cams may be used to block and lift. Any type of transmission may be used.

I claim:

A swingable fender for a vehicle to reduce the shock of impact, comprising ground-engaging means, pivotally connected to one end of the vehicle in such a manner as to lift the vehicle about the vehicle wheels on the other end of the vehicle, means for releasing said ground-engaging means upon impact of the vehicle with a resistant object, said ground-engaging means including independent yielding means within the said fender yielding longitudinally of the fender when the fender is substantially in an upright position to permit relative movements between the vehicle and the parts of the ground-engaging means in engagement with the ground.

References Cited

UNITED STATES PATENTS

| | | | |
|---|---|---|---|
| 1,419,366 | 6/1922 | Fial | 180—83 |
| 1,442,401 | 1/1923 | Grigas | 180—83 |
| 2,066,468 | 1/1937 | Grigas | 180—83 |
| 2,966,225 | 12/1960 | Carroll | 180—83 |

FOREIGN PATENTS 592,295   5/1947   Great Britain.

KENNETH H. BETTS, *Primary Examiner.*